United States Patent
Singh et al.

(10) Patent No.: US 12,028,314 B2
(45) Date of Patent: Jul. 2, 2024

(54) PROVIDING PERSISTENT EXTERNAL INTERNET PROTOCOL ADDRESS FOR EXTRA-CLUSTER SERVICES

(71) Applicant: Cisco Technology, Inc., San Jose, CA (US)

(72) Inventors: Akshya Kumar Singh, Dublin, CA (US); Rajesh Nataraja, Sunnyvale, CA (US); Shyam N. Kapadia, San Jose, CA (US); Sri Goli, Dublin, CA (US); Naoshad Mehta, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/184,096

(22) Filed: Mar. 15, 2023

(65) Prior Publication Data

US 2023/0216828 A1     Jul. 6, 2023

Related U.S. Application Data

(63) Continuation of application No. 17/531,241, filed on Nov. 19, 2021, now Pat. No. 11,671,401.

(Continued)

(51) Int. Cl.
*H04L 61/5007* (2022.01)
*H04L 61/5061* (2022.01)
*H04L 101/668* (2022.01)

(52) U.S. Cl.
CPC ...... *H04L 61/5007* (2022.05); *H04L 61/5061* (2022.05); *H04L 2101/668* (2022.05)

(58) Field of Classification Search
CPC ........... H04L 2101/668; H04L 61/5007; H04L 61/5061

(Continued)

(56) References Cited

U.S. PATENT DOCUMENTS 10,191,778 B1     1/2019  Yang et al.
11,316,822 B1 *  4/2022  Gawade .............. H04L 61/5084
(Continued)

FOREIGN PATENT DOCUMENTS

CN    107580083 A    1/2018
CN    111124604 A    5/2020
(Continued)

OTHER PUBLICATIONS

"Service," Kubernetes, https://kubernetes.io/docs/concepts/services-networking/service/, retrieved Oct. 8, 2021, 14 pages.
(Continued)

*Primary Examiner* — David P Zarka
(74) *Attorney, Agent, or Firm* — Edell, Shapiro & Finnan, LLC

(57) ABSTRACT

Techniques are presented herein for providing a persistent external Internet Protocol (IP) address for extra-cluster services. One example involves initiating, in a cluster, a first pod with a label that identifies a service. The first pod is configured to provide the service to one or more network entities outside the cluster. The first pod is assigned an IP address configured for communicating outside the cluster. A mapping of the service to the IP address is stored. In response to a determination that the service has been disrupted, a second pod is initiated in the cluster with the label that identifies the service. The second pod is configured to provide the service to the one or more network entities outside the cluster. Based on the mapping and the label that identifies the service, the IP address is assigned to the second pod.

20 Claims, 12 Drawing Sheets

Related U.S. Application Data

(60) Provisional application No. 63/166,168, filed on Mar. 25, 2021.

(58) Field of Classification Search
USPC .......................................................... 709/245
See application file for complete search history.

(56) References Cited

U.S. PATENT DOCUMENTS

| | | | |
|---|---|---|---|
| 11,671,401 B2 * | 6/2023 | Singh | H04L 61/5061 709/245 |
| 2003/0204711 A1 * | 10/2003 | Guess | G06F 9/44505 713/1 |
| 2010/0287548 A1 | 11/2010 | Zhou et al. | |
| 2012/0158992 A1 * | 6/2012 | Lam | H04L 61/5007 709/238 |
| 2013/0262801 A1 * | 10/2013 | Sancheti | H04L 67/1097 711/162 |
| 2018/0019969 A1 | 1/2018 | Murthy | |
| 2018/0270288 A1 * | 9/2018 | Wang | H04L 65/70 |
| 2019/0102226 A1 | 4/2019 | Caldato et al. | |
| 2019/0207832 A1 | 7/2019 | Dor | |
| 2020/0034254 A1 | 1/2020 | Natanzon | |
| 2020/0322233 A1 | 10/2020 | Gao et al. | |
| 2020/0403872 A1 | 12/2020 | Shivashankara et al. | |
| 2021/0064414 A1 * | 3/2021 | Lolage | G06F 9/45541 |
| 2021/0328858 A1 | 10/2021 | Asveren et al. | |

FOREIGN PATENT DOCUMENTS

| | | |
|---|---|---|
| CN | 112202940 A | 1/2021 |
| WO | 2014139462 A1 | 9/2017 |

OTHER PUBLICATIONS

"Overview," Kubernetes, https://kubernetes.io/docs/concepts/overview/_print/, retrieved Oct. 8, 2021, 21 pages.
Asena Hertz, "Kubernetes Rescheduling: A Pod's Life and Reincarnation," Turbonomic, https://blog.turbonomic.com/blog/on-technology/kubernetes-rescheduling-with-turbonomic, Jul. 2, 2018, 8 pages.
"Cluster Networking," Kubernetes, https://kubernetes.io/docs/concepts/cluster-administration/networking/, retrieved Oct. 10, 2021, 6 pages.
"Exposing an External IP Address to Access an Application in a Cluster," Kubernetes, https://kubernetes.io/docs/tutorials/stateless-application/expose-external-ip-address/, last modified Mar. 15, 2021, 4 pages.
"Cisco Nexus Insights 5.0," Cisco, Whitepaper, Jan. 2020, 27 pages.
"Cisco Nexus Dashboard: Data Center Network Dashboard," https://www.cisco.com/c/en/us/products/data-center-analytics/nexus-dashboard/index.html, retrieved Oct. 10, 2021, 16 pages.
"Cisco DCNM Media Controller Configuration Guide, Release 11.5(1)," Cisco, Dec. 22, 2020, 316 pages.
"Cisco DCNM Installation Guide for Media Controller Deployment, Release 11.0(1)," Cisco, Feb. 14, 2019, 68 pages.
"Cisco DCNM Media Controller Configuration Guide, Release 11.3(1)," Cisco, Dec. 20, 2019, 282 pages.
"Service," Kubernetes, https://kubernetes.io/docs/concepts/services-networking/service/, last modified Feb. 28, 2021, 35 pages.
"Overview," Kubernetes, https://kubernetes.io/docs/concepts/overview/, last modified Sep. 26, 2020, 4 pages.
"Cluster Networking," Kubernetes, https://kubernetes.io/docs/concepts/cluster-administration/networking/, last modified Dec. 16, 2020, 15 pages.
"Cisco Nexus Dashboard: Data Center Network Dashboard," https://www.cisco.com/c/en/us/products/data-center-analytics/nexus-dashboard/index.html, Jan. 27, 2021, 11 pages.
International Search Report and Written Opinion in International Application No. PCT/US2022/020753, dated Jun. 3, 2022, 13 pages.

* cited by examiner

PROVIDING PERSISTENT EXTERNAL INTERNET PROTOCOL ADDRESS FOR EXTRA-CLUSTER SERVICES

CROSS REFERENCE TO RELATED APPLICATION

This application is a continuation of U.S. application Ser. No. 17/531,241, filed Nov. 19, 2021, which in turn claims the benefit of U.S. Provisional Application No. 63/166,168, filed Mar. 25, 2021, the entirety of which is incorporated herein by reference.

TECHNICAL FIELD

The present disclosure relates to computer networking.

BACKGROUND

Kubernetes (K8s) is a platform for managing containerized workloads and services. K8s provides a number of features such as service discovery, load balancing, storage orchestration, automated rollouts and rollbacks, automatic bin packing, self-healing, and secret configuration management. The platform can be implemented with a K8s cluster that consists of a set of nodes that run containerized applications. The nodes host application workload components called pods.

DESCRIPTION OF EXAMPLE EMBODIMENTS

Overview

Techniques are presented herein for providing a persistent external Internet Protocol (IP) address for extra-cluster services. One example embodiment involves initiating, in a cluster, a first pod with a label that identifies a service. The first pod is configured to provide the service to one or more network entities outside the cluster. The first pod is assigned an IP address configured for communicating outside the cluster. A mapping of the service to the IP address is stored. In response to a determination that the service has been disrupted, a second pod is initiated in the cluster with the label that identifies the service. The second pod is configured to provide the service to the one or more network entities outside the cluster. Based on the mapping and the label that identifies the service, the IP address is assigned to the second pod.

Example Embodiments

Figure 1:
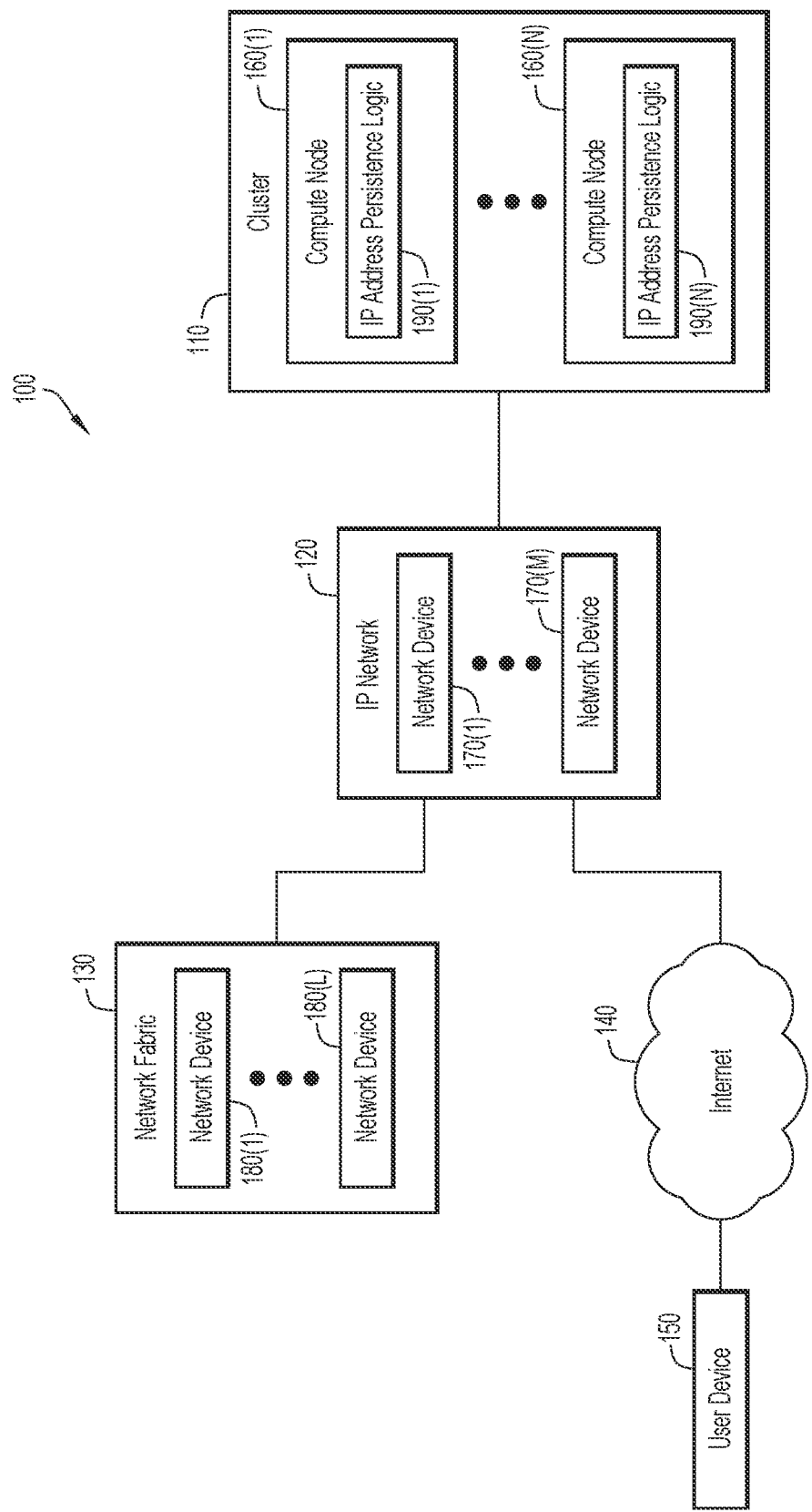
FIG. 1 illustrates a system configured to provide a persistent external Internet Protocol (IP) address for extra-cluster services, according to an example embodiment.

FIG. 1 illustrates a system 100 configured to provide a persistent external Internet Protocol (IP) address for extra-cluster services, according to an example embodiment. System 100 includes cluster 110, IP network 120, network fabric 130, Internet 140, and user device 150. Cluster 110 includes compute nodes 160(1)-160(N). IP network 120 may be a Local Area Network (LAN) or Wide Area Network (WAN) that includes network devices 170(1)-170(M). Network fabric 130 includes network devices 180(1)-180(L). Network devices 170(1)-170(M) and network devices 180(1)-180(L) may include switches, routers, computing devices, storage devices, etc.

Compute nodes 160(1)-160(N) may each include a management interface and a data interface. The management interfaces may enable management of compute nodes 160(1)-160(N), e.g., via user device 150, for web/Application Programming Interface (API) access to cluster 110. The data interface may establish IP reachability between network fabric 130 and cluster 110.

Cluster 110 may be configured to provide one or more services to one or more network entities outside cluster 110, such as user device 150 and/or network devices 180(1)-180(L). In one example, the one or more services may include a service for collecting data (e.g., telemetry data) from network fabric 130. Thus, telemetry data obtained from network devices 180(1)-180(L) may be sent to one or more compute nodes 160(1)-160(N). In this example, network devices 180(1)-180(L) may also be referred to as "consumers" or "publishers," and compute nodes 160(1)-160(N) may also be referred to as "collectors."

Cluster 110 may offer a service that relates to Day-2 operations, such as monitoring, trouble-shooting, and analytics. A software application running on cluster 110 may provide granular pieces of data from network devices 180(1)-180(L) streamed out to the application for historical correlation, predictive analysis, anomaly detection, resource tracking, and various other advanced machine learning insights. Network devices 180(1)-180(L) may stream out data (e.g., using a dial-out model) via a mix of software and hardware telemetry.

In one example use case, a data center may be present. The data center may include network fabric 130 (including network devices 180(1)-180(L)), and may or may not include cluster 110. Cluster 110 (e.g., one or more of compute nodes 160(1)-160(N)) may host a network switch dashboard that serves as a console to streamline data center network operations and management. The dashboard may serve as a microservices-based agile platform for hosting various kinds of data center services, both for on-premise as well as public cloud environments. In one example, the platform may be built on top of Kubernetes (K8s) with multiple K8s nodes (virtual and/or physical), and may support a scale-out model. In particular, cluster 110 may host one or more K8s nodes on compute nodes 160(1)-160(N), and each K8s node may include at least one pod that provides the service (e.g., telemetry data collection).

Each pod of cluster 110 may be configured with an IP address that enables communication with network devices 180(1)-180(L). Since the amount of data being streamed out can be relatively large—especially for hardware telemetry data, even in a medium sized network—the IP addresses of the pods may be known by network devices 180(1)-180(L), i.e., externally to cluster 110. As a result, these IP addresses may be referred to as "external IP addresses." Traffic may be destined to and/or sourced from cluster 110 based on the external IP addresses. Network devices 180(1)-180(L) may be configured with the external IP addresses—which may be pre-known/configured—and ports of the pods for streaming telemetry destination(s).

Sometimes, failovers can occur when a pod is deployed. For example, if compute node 160(1) is hosting a service/pod and shuts down, the service/pod may be brought up on compute node 160(2). Conventionally, when the pod is brought back up on compute node 160(2), cluster 110 would assign to that pod a new external IP address (i.e., one that is different from the external IP address that was previously assigned to the pod on compute node 160(1)). More specifically, a Container Networking Interface (CNI) plug-in would be invoked with an IP Address Management (IPAM) module that would assign to the pod any free IP address. However, changes to external IP address caused by failover scenarios can create problems in conventional systems.

For example, conventionally, configuration changes would typically be performed during preset maintenance windows, because switch configuration changes could affect large portions of the infrastructure sitting behind network devices 180(1)-180(L). For instance, conventionally, network devices 180(1)-180(L) might be configured one time, e.g., when the telemetry streaming application is enabled on network devices 180(1)-180(L). The configuration would typically be triggered via communication to a network controller that in turn performs the appropriate configuration provisioning, including the current external IP address of the pod.

As a result, conventionally, the service provider (e.g., the entity responsible for managing cluster 110) would not have the ability to reprogram the external IP addresses on network devices 180(1)-180(L) dynamically. In particular, it would not be feasible using conventional approaches to re-configure or re-program network devices 180(1)-180(L) with the updated external IP address of the pod every time one of compute nodes 160(1)-160(N) shuts down. Thus, conventional failover scenarios could cause loss of service for network devices 180(1)-180(L).

Moreover, these problems cannot be resolved with typical K8s constructs (e.g., service types such as headless, node-port, or external load balancers). The headless service type is based on Domain Name Service (DNS) resolution of the service name directly to the appropriate pod IP address. However, the headless service type is used only for intra-cluster communication. Even if such a service could be extended for extra-cluster communication, many network switches do not support DNS resolution of collector/receiver destinations; instead, the IP address and port must be explicitly configured.

The node-port service type exposes a per-cluster service that listens on a well-known port above 30,000. There are at least two problems with this approach. First, the port range for collector/receiver destinations for streaming telemetry on the switch is much larger and does not have a range restriction. Second, when a compute node fails, the switches that are streaming data to that compute node may need to be re-configured with a compute node IP address of one of the existing compute nodes in the cluster that are still online. While this is the approach that has been employed for an Application Centric Infrastructure (ACI)-based deployment managed by the network controller, in general, it is not practical to make configuration changes on a network whenever a compute node goes down.

In the case of external load balancers, all switches may be configured with the same Virtual IP (VIP) address that is hosted on the external load balancer. However, having an external load balancer can be expensive, especially because the amount of telemetry traffic streaming out of the switches can be relatively large. A software load balancer in particular funnels traffic through a central point, which can create bottlenecks, especially in larger networks.

There are many services that can be impacted by failover scenarios that would, conventionally, prompt a change to the external IP address of the pod. In the context of Data Center Network Management (DCNM), there are several shortcomings in conventional approaches for enabling communication between services and legacy network switches as part of fabric onboarding/monitoring. For example, incoming requests for Trap/Syslog services on DCNM require an IP address to receive data from a legacy network switch. However, this IP address can be configured only once on these legacy network switches. No API exists to update server IP addresses on an as-needed basis.

Conventionally, DCNM can also use Secure Copy Protocol/Trivial File Transfer Protocol (SCP/TFTP) services to move files or perform PowerOn Auto Provisioning (POAP) of a switch. In both scenarios, the SCP/TFTP server is be on the DCNM. The switch does not support specifying a particular port for SCP or TFTP, and there is no dedicated IP address(es) on the cluster for copying the files. The single server model does not scale well and there is a need to run multiple backend servers to serve these switches. The problem(s) associated with SCP/TFTP may be similar to the problem(s) associated with Trap/Syslog use cases described above, except instead of one service backend, the load would be distributed across several backend pods distributed across a cluster. Dynamic Host Configuration Protocol (DHCP) services may be similarly impacted.

While IP addresses of different nodes of the cluster can be programmed to a set of nodes, and hence provide static load balancing, there are several issues with this approach. One issue is that not all nodes are known in advance: as a dynamic cluster is built, nodes can be added and/or deleted. This requires additional IP addresses for each node besides the typical Out-Of-Band (OOB) IP addresses. Furthermore, if a node goes down, the IP address(es) are moved to other nodes, thereby triggering multiple external IP addresses for a given service on the nodes.

Another service that can be impacted by failover scenarios involves an End Point Locator (EPL) feature. When a network controller application is running on top of a cluster, this application could spawn containers that interact with the network devices in the network fabric. Some of those containers would need an external IP address for direct communication with the network devices. For example, for EPL functionality, per Virtual Extensible Local Area Network (VXLAN) Ethernet Virtual Private Network (EVPN) fabric, a Border Gateway Protocol (BGP) daemon would be run in a container, which would in turn peer with Route-Reflectors (RR) running on Spine switches in the network fabric for tracking endpoint locality and reachability based on BGP EVPN advertisements. In this case, the Spine-RR would need an IP address to be configured as a BGP peer and accept a BGP connection only if the source IP address of the incoming BGP packet is actually the IP address configured as the BGP EVPN neighbor on that Spine-RR.

The EPL feature runs a GoBGP client in a pod container, using the configuration on the switch to establish a BGP RR client connection. A DCNM can run multiple EPL instances and each of them can make a BGP connection with RRs of the network fabric. That is, if there are two fabrics, Fab1 and Fab2, DCNM can run two instances of EPL deployments, each instance peering with its own RR. To perform the peering, every EPL GoBGP pod requires an IP address. Since each pod is a single replica deployment, the pods can come up anywhere and boomeranging is not an option. EPL GoBGP pods only need an in-band connection.

One unique nature of EPL is that the switch does not make the connection to the container; rather, the container makes the connection to the switch. Because the IP address is configured as a neighbor, sourcing the package out of the container to the switch should involve the IP address associated with the deployment. In summary, this requirement can be treated as services running on an internal K8s network communicating with external IP addresses. Hence, typical source Network Address Translation (NAT) is required to ensure that the source IP address of the packet leaving cluster is NATed with the pre-configured external IP address per node.

Still another service that can be impacted by failover scenarios is Programmable Media Network (PMN) telemetry. PMN runs a telemetry receiver pod in one of the cluster nodes. The IP address of the telemetry receiver pod is configured on the switches as a telemetry destination end point. This is a single deployment and single pod scenario, but can receive telemetry data from in-band or OOB networks.

Yet another service that can be impacted by failover scenarios is Storage Area Network (SAN) telemetry. SAN telemetry runs on an OOB network, and the telemetry receiver is a single instance. In order to support larger-scale deployments, the service may run on multiple pods. In that case, the scale-out occurs at the DCNM level rather than the K8s level of the pod. The IP address for a given pod is configured on the switches, and hence whenever the pod moves, the IP address changes.

Another example of a service that can be impacted by failover scenarios is insight collection. Here, the application programs the collector IP addresses into the network switches and cannot be updated via an API at a later time. As a result, the IP address of the dashboard node is routable so that switches can stream data to a pre-known IP address. An OOB IP address or a management IP address cannot be used because a node failure scenario would result in traffic black-holing. An additional challenge is that, because one collector cannot handle traffic coming from a set of switches, multiple IP addresses are needed. A switch can send telemetry data to one Universal Telemetry Receiver (UTR), and each UTR can handle telemetry data from about two hundred switches.

Therefore, conventionally, many different types of services would be disrupted during a failover scenario. It will be appreciated that this discussion of services is non-exhaustive, and there may be still additional services that are not specifically mentioned above that are nevertheless impacted by failover scenarios that cause the external IP address of a pod to change.

Accordingly, to prevent disruption to services during failover scenarios that cause the external IP address of a pod to change, compute nodes 160(1)-160(N) are provided with IP address persistence logic 190(1)-190(N). IP address persistence logic 190(1)-190(N) causes compute nodes 160(1)-160(N) to perform operations described herein. These operations may enable cluster 110 to preserve the binding of a given external IP address to a corresponding pod/service ID when the pod moves between compute nodes 160(1)-160(N). Thus, cluster 110 may make the IP addresses assigned to the pods/services "sticky." That is, the IP addresses may remain assigned to the corresponding pod/service even in the event of a failure scenario. As a result, IP address persistence logic 190(1)-190(N) may ensure that the external IP addresses are resilient to failures by compute nodes 160(1)-160(N). For example, an IP address of a microservice hosted at compute nodes 160(1)-160(N) may persist during dynamic service placements. The external IP address may be migrated to the same one of compute nodes 160(1)-160(N) to which the pod is rescheduled. In some examples, external endpoints may remain unaware that a failover occurred.

In one example, cluster 110 may initiate a first pod with a label that identifies a service. The label and the service may form a key-value pair. The first pod may be hosted, for instance, on compute node 160(1). The first pod may be configured to provide the service to one or more network entities outside cluster 110. The network entities may include network devices 180(1)-180(L) and/or user device 150. For example, the service may be a service for collecting telemetry data from network fabric 130. Or the service may be a service for enabling management of cluster 110 by user device 150. It will be appreciated that the first pod may be configured to provide any suitable service.

Cluster 110 may assign, to the first pod, an IP address (e.g., IPv4 address, IPv6 address, etc.) configured for communicating outside cluster 110. Cluster 110 may store a mapping of the service to the IP address. Later, compute node 160(1) may go down, disrupting the service provided by the first pod. This may prompt a failover to, e.g., compute node 160(2). Thus, in response to determining that the service has been disrupted, cluster 110 may initiate, in cluster 110 (e.g., compute node 160(2)), a second pod with the label that identifies the service. The second pod may be configured to provide the service to the one or more network entities outside the cluster.

Based on the mapping and the label that identifies the service, cluster 110 may assign the IP address to the second pod. For example, cluster 110 may determine that the label of the second pod designates the service, and may further identify the IP address based on the mapping. Because the service may retain the IP address even after failover to compute node 160(2), the IP address may be "sticky." In one example, a CNI/IPAM may examine the label before assigning an IP address, determine whether an IP address has been allocated to the service (e.g., by referencing the mapping), and, if so, preserve the IP address for the service. If an IP address has not been allocated to the service, the CNI/IPAM may instead assign a free IP address. The CNI/IPAM may use a clean CNI plugin interface.

Cluster 110 may provide, by the second pod, the service to the one or more network entities outside the cluster using the IP address. As a result, the one or more network entities may continue to use the same IP address that was used before the failover occurred. In one example, the second pod may collect telemetry data from network fabric 130 while preserving a configuration or provisioning of network devices 180(1)-180(L). By preserving the service binding to the IP address, cluster 110 may avoid impacting network devices 180(1)-180(L), even when a pod is re-created on different one(s) of compute nodes 160(1)-160(3). In another example, the second pod may enable management of cluster 110 by user device 150. Providing the service by the second pod using the same IP address may mitigate a negative impact on the service, such as a temporary or permanent disruption to the service. The service binding to the IP address may facilitate external service connectivity for external devices/endpoints (e.g., network devices 180(1)-180(L)). Thus, network devices 180(1)-180(L) may be programmed once, and cluster 110 may thereafter maintain the service binding to IP addresses.

Cluster 110 may thereby improve the functionality of applications running on top of the dashboard platform. Cluster 110 may support IP address persistence of services running on top of a dashboard platform that supports external connectivity without any traffic tromboning. In particular, techniques described herein may avoid the "tromboning" problem by assigning, to containers, external IP addresses from a user-specified pool with stickiness and reachability advertisements from one or more of compute nodes 160(1)-160(N) which host the container. Since the source IP address of the services cannot change, cluster 110 may ensure that the pods are consistently reachable on respective pre-configured IP addresses. If a backend pod running an external service migrates to another one of compute nodes 160(1)-160(N) (e.g., because one of compute nodes 160(1)-160(N) needs to be returned and/or experiences a failure), the corresponding IP address may also be migrated. As a result, the IP address that is attached to the pod may migrate when the pod moves across compute nodes 160(1)-160(N).

Techniques described herein may ensure that the IP addresses are sticky and resilient to node failures. As a result, reconfiguration may be avoided on an external physical network to handle transient or permanent node failure scenarios. During migration, traffic black-holing may occur for a short period of time; in the time taken to detect failure of one of compute nodes 160(1)-160(N), the pod may be rescheduled and migration of an external IP address to another of compute nodes 160(1)-160(N) may occur.

As explained in greater detail below, compute nodes 160(1)-160(N) may be Layer-2 or Layer-3 adjacent. In a Layer-2 adjacent deployment, applications running on cluster 110 may obtain sticky, persistent IP addresses with respect to a data/fabric interface while avoiding Layer-3 route setup/advertisement. In a Layer-3 adjacent deployment, a protocol such as Border Gateway Protocol (BGP) may be employed on top for/32 or/128 persistent IP address advertisement.

Figure 2:
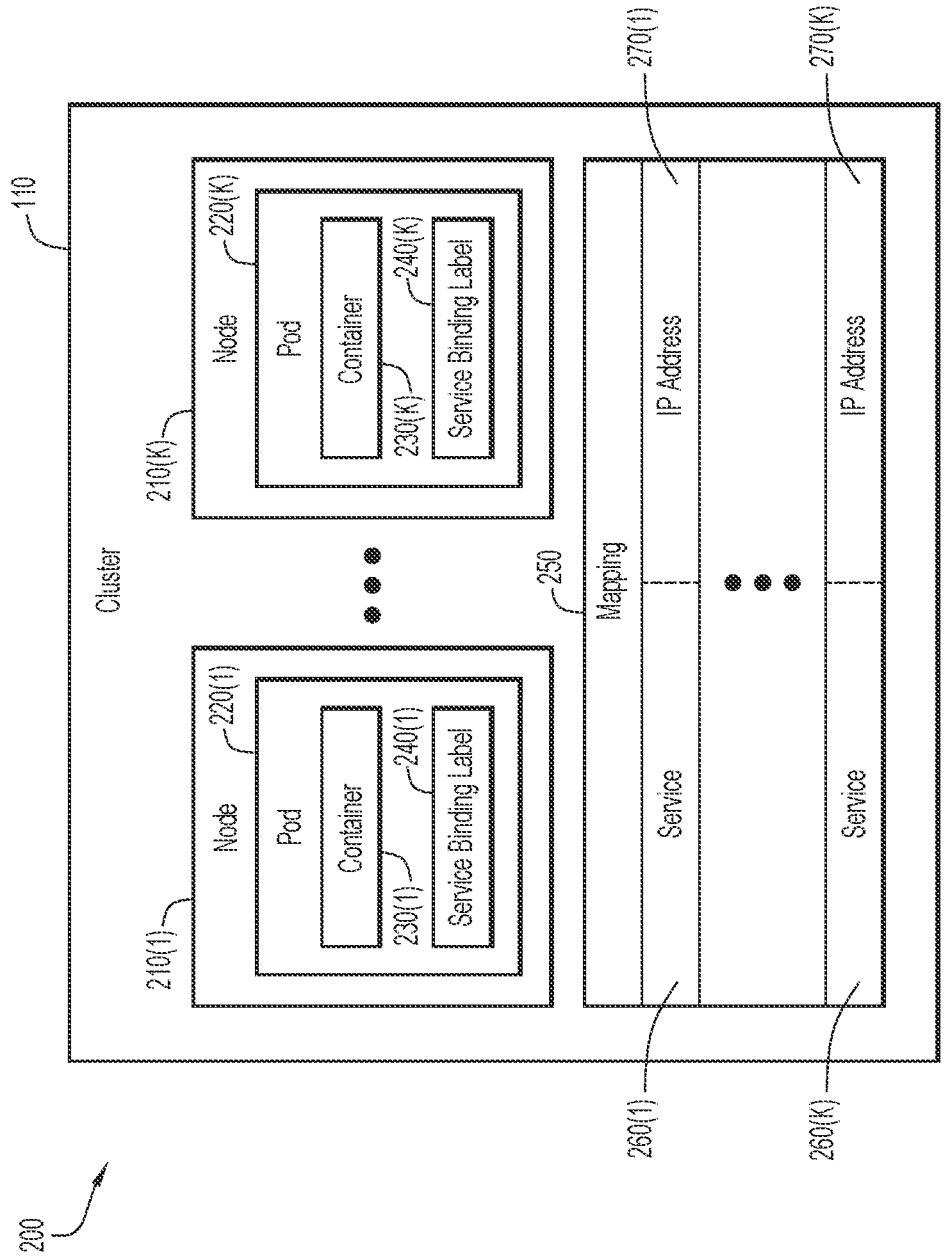
FIG. 2 illustrates a logical depiction of a cluster configured to provide a persistent external IP address for extra-cluster services, according to an example embodiment.

With continuing reference to FIG. 1, FIG. 2 illustrates a logical depiction 200 of cluster 110, according to an example embodiment. Cluster 110 includes nodes 210(1)-210(K), which may be hosted on one or more of compute nodes 160(1)-160(N). For instance, node 210(1) may be hosted on compute node 160(1). Nodes 210(1)-210(K) include pods 220(1)-220(K). Pods 220(1)-220(K), in turn, include containers 230(1)-230(K). Pods 220(1)-220(K) may also be annotated with service binding labels 240(1)-240(K).

Cluster 110 also includes mapping 250. Mapping 250 may be stored in a database hosted on one or more of compute nodes 160(1)-160(N). As shown, mapping 250 include information describing one-to-one associations of services 260(1)-260(K) and IP addresses 270(1)-270(K). Service binding labels 240(1)-240(K) may identify services 260(1)-260(K). There may be one-to-one bindings between pods 220(1)-220(K) and services 260(1)-260(K) performed by pods 220(1)-220(K). For example, service 260(1) may be provided by pod 220(1) and, therefore, may be identified by service binding label 240(1). IP address 270(1), which is associated with service 260(1), may be an external IP address assigned to pod 220(1). In other words, pod 220(1) may use IP address 270(1) to provide service 260(1) to one or more network entities outside cluster 110. In one example, the application may set the replication count to one.

Because services 260(1)-260(K) may use IP addresses 270(1)-270(K) to send the traffic externally (e.g., outside cluster 110), each of IP addresses 270(1)-270(K) may be used on a single one of the nodes 210(1)-210(K). As a result, in one example, each one of pods 220(1)-220(K) may request a respective one of IP addresses 270(1)-270(K). Services 260(1)-260(K) may add service binding labels 240(1)-240(K) in the specifications of pods 220(1)-220(K) to request these external IP addresses.

When compute node 160(1) goes down, this may cause a disruption to service 260(1) and may prompt a failover of pod 220(1) to, e.g., compute node 160(2). In response to determining that service 260(1) has been disrupted, cluster 110 may initiate, in compute node 160(2), pod 220(K+1) with service binding label 240(1), which identifies service 260(1). Pod 220(K+1) may be configured to provide service 260(1) to the one or more network entities outside the cluster. Based on mapping 250 and service binding label 240(1), cluster 110 may assign IP address 270(1) to pod 220(K+1). More specifically, cluster 110 may determine that service binding label 240(1) designates service 260(1), and may further identify IP address 270(1) based on mapping 250.

Figure 3:
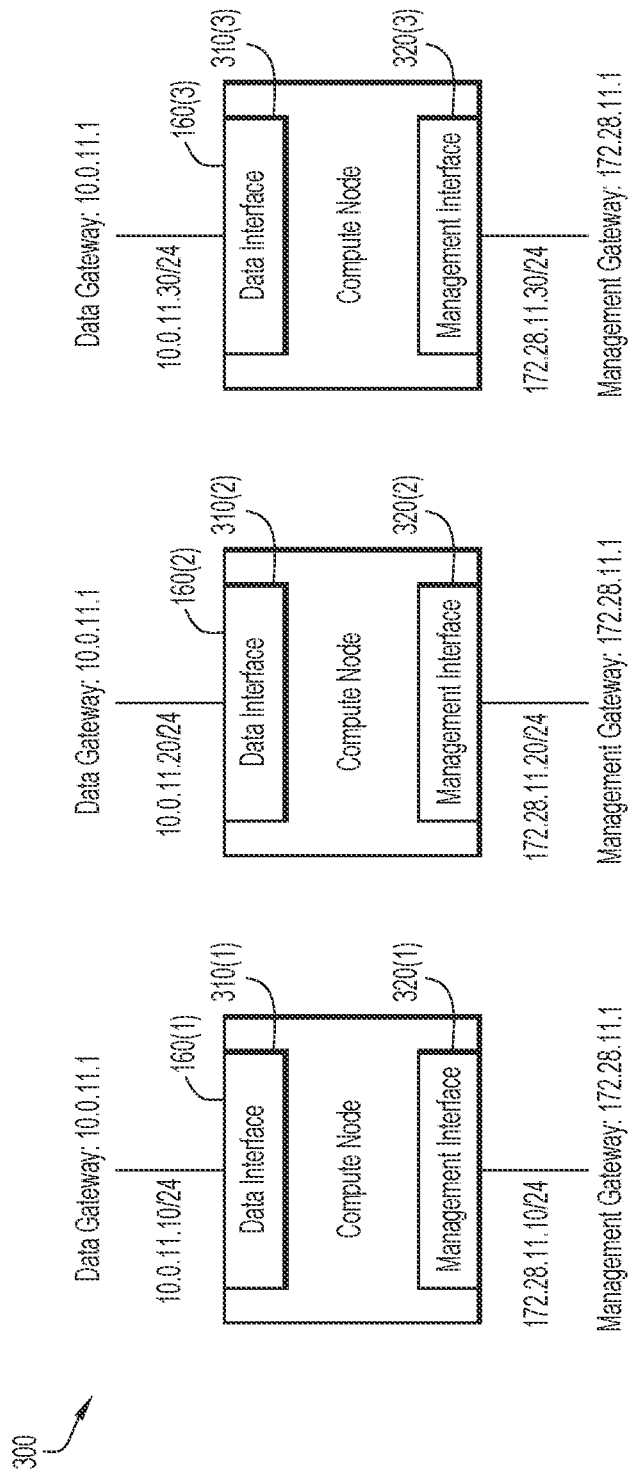
FIGS. 3, 4A, and 4B illustrate a Layer-2 adjacent use case in which compute nodes in a cluster belong to the same subnetwork, according to an example embodiment.

With continuing reference to FIG. 1, FIGS. 3, 4A, and 4B illustrate a Layer-2 adjacent use case in which compute nodes 160(1)-160(3) belong to the same subnetwork, according to an example embodiment. FIG. 3 illustrates a system 300 that includes compute nodes 160(1)-160(3), which are Layer-2 adjacent. Compute nodes 160(1)-160(3) include data interfaces 310(1)-310(3) and management interfaces 320(1)-320(3). Data interfaces 310(1)-310(3) may also be referred to as in-band interfaces, and management interfaces 320(1)-320(3) may also be referred to as OOB interfaces.

Data interfaces 310(1)-310(3) may be used to collect data (e.g., telemetry data) from network devices 180(1)-180(L). Management interfaces 320(1)-320(3) may be used for other communications, such as commands from a Graphical User Interface (GUI) on user device 150. The GUI may display current/used external IP addresses, enable the user to set a minimum number of external IP address for (e.g., required by) a given application, and/or limit traffic on the external IP addresses.

In this example, data interfaces 310(1)-310(3) have IP addresses 10.0.11.10/24, 10.0.11.20/24, and 10.0.11.30/24, respectively, and have the same data gateway (10.0.11.1). As a result, the IP addresses of data interfaces 310(1)-310(3) belong to the same subnetwork. Similarly, management interfaces 320(1)-320(3) have IP addresses 172.28.11.10/24, 172.28.11.20/24, and 172.28.11.30/24, respectively, and have the same management gateway (172.28.11.1). As a result, the IP addresses of management interfaces 320(1)-320(3) belong to the same subnetwork. However, in this example, the subnetwork of the IP addresses of data interfaces 310(1)-310(3) is different from the subnetwork of the IP addresses of management interfaces 320(1)-320(3).

Figure 4A:
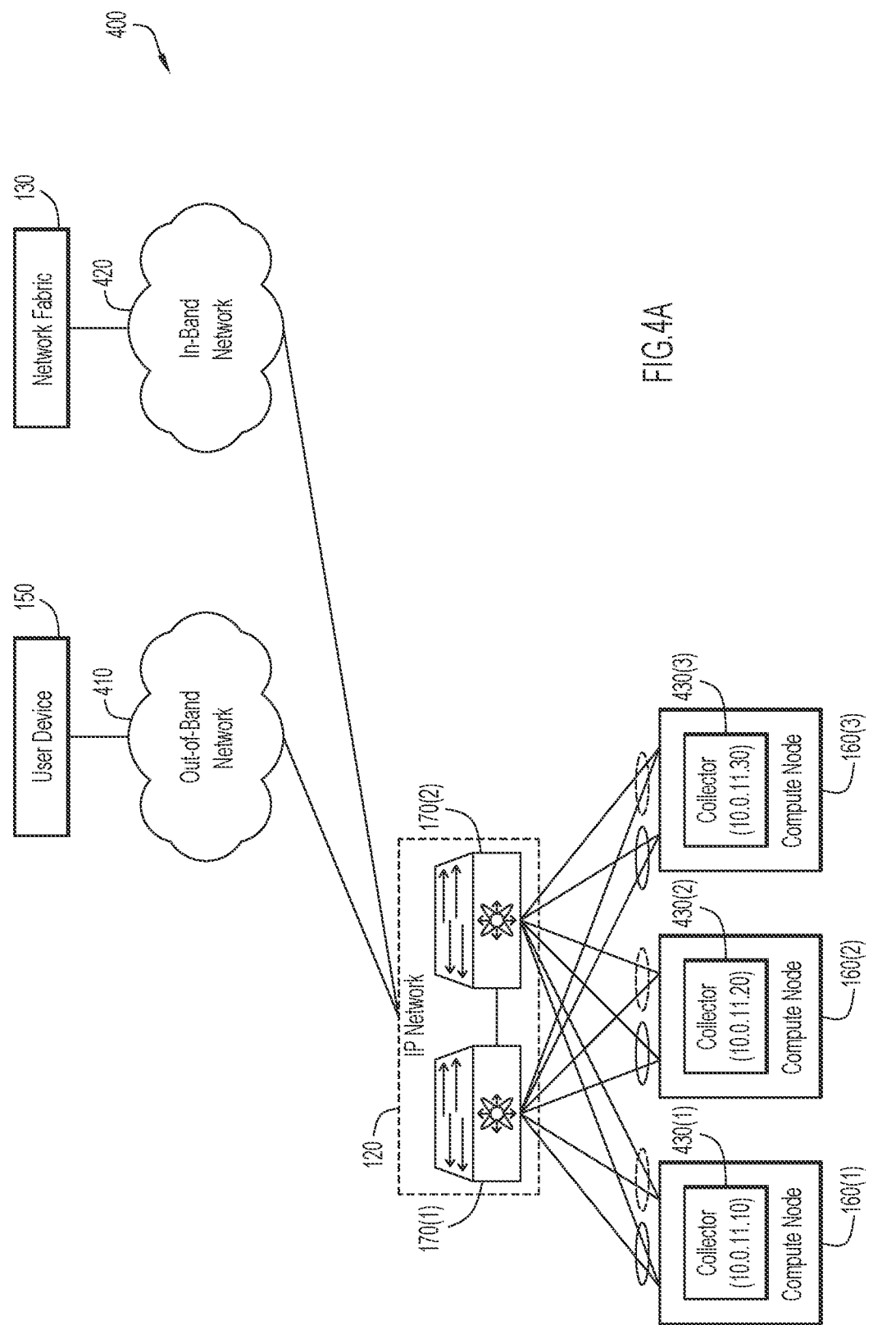

FIG. 4A illustrates a Layer-2 adjacent system 400. Layer-2 adjacent system 400 includes user device 150, OOB network 410, network fabric 130, in-band network 420, IP network 120, and compute nodes 160(1)-160(3). OOB network 410 (e.g., Internet 140) may enable external web access to cluster 110. In-band network 420 may provide IP reachability to network fabric 130 via front-panel ports of compute nodes 160(1)-160(3). Compute nodes 160(1)-160(3) include collectors 430(1)-430(3). Collectors 430(1)-430(3) may be services/microservices (e.g., K8s services) for collecting telemetry data from network fabric 130 via data interfaces 310(1)-310(3).

As shown, compute node 160(1) communicates with network devices 170(1) and 170(2) via data interface 310(1) and management interface 320(1); compute node 160(2) communicates with network devices 170(1) and 170(2) via data interface 310(2) and management interface 320(2); and compute node 160(3) communicates with network devices 170(1) and 170(2) via data interface 310(3) and management interface 320(3). Compute nodes 160(1)-160(3) communicate with network devices 170(1) and 170(2) via data interfaces 310(1)-310(3) over a Virtual Local Area Network (VLAN) designated for data communications (e.g., 10.0.11.1/24). Compute nodes 160(1)-160(3) communicate with network devices 170(1) and 170(2) via management interfaces 320(1)-320(3) over a VLAN designated for management communications (e.g., 172.28.11.1/24).

In one example, after cluster 110 has been deployed, a network user may define a set/pool of external IP addresses for compute nodes 160(1)-160(3). The external IP addresses may be a cluster-wide IP address pool, and may each be routable from any of compute nodes 160(1)-160(N). The external IP addresses may be used for management/data functions by services running on top of cluster 110. In this example, the pool of external IP addresses may be configured on in-band network 420 for data operations, though it will be appreciated that the network user may configure another pool on OOB network 410 for management operations. As a result, there may be two service pools, one for data and one for management. Named service pools may not be necessary because collectors 430(1)-430(3) may request the external IP addresses from one of the node networks (e.g., management or data).

Thus, the network user may configure the external node-level IP addresses used by collectors 430(1)-430(3) to communicate. In one example, the external IP addresses may be a mix of comma-separated, disjoint IP ranges that reside in the same subnetwork as the management or data interface. In the specific example of FIG. 4A, the pool of external IP addresses for the data functions may include 10.0.11.10, 10.0.11.20, and 10.0.11.30.

The application may define collectors 430(1)-430(3) with an additional label "externalservice.case.cncfio" that indicates either "management" or "data." In this example, because collectors 430(1)-430(3) are configured to collect telemetry data from network fabric 130, the additional label indicates "data." The label "externalservice.case.cncf.io" may use the value of the service name that is requesting the external IP address.

A dashboard application/service controller of cluster 110 may monitor collectors 430(1)-430(3). When collectors 430(1)-430(3) are created, collectors 430(1)-430(3) may request the configured external IP addresses via a K8s request from one of the pools (here, the data pool), and the controller may try to allocate persistent external IP addresses from the specified/requested pool of external IP addresses for data functions. The controller may bind the configured external IP addresses as collectors 430(1)-430(3) become available. In one example, the controller may assign the IP addresses for the external service request(s) to collectors 430(1)-430(3). The controller may further push, to collectors 430(1)-430(3), the environment variable "EXTERNAL_SERVICE_IP_ADDRESS." In another example, collectors 430(1)-430(3) may have annotations that are populated with the IP addresses.

If no IP addresses are available from the pool for data functions or the controller otherwise fails to allocate the IP address, service creation will fail until the controller succeeds. However, in the example of FIG. 4A, the application successfully assigns, to collectors 430(1)-430(3), IP addresses 10.0.11.10, 10.0.11.20, and 10.0.11.30, respectively. Thus, the IP addresses of collectors 430(1)-430(3) belong to the subnetwork associated with data interfaces 310(1)-310(3). Once the IP addresses have been allocated, other pods may be prohibited from requesting those IP addresses. The network user may attempt to remove the configuration of collectors 430(1)-430(3), and the configurations may be removed after collectors 430(1)-430(3) have released the external IP addresses.

The controller may create a Multus Network Attachment Definition (NAD) to configure the CNI/IPAM for external service access. As pods for the service are scheduled on compute nodes 160(1)-160(3), the controller may determine whether the requested service has been configured and created. If not, the pod may remain in a container-creating state until the service succeeds. Once the service succeeds, the controller may add the proper annotations to that pod to create an additional, external network that inherits the external service IP address(es). While the IP addresses are in use, collectors 430(1)-430(3) may not be deleted. Once collectors 430(1)-430(3) are disabled, the external IP addresses may be released back to the available pool. Finalizers may be added on collectors 430(1)-430(3) to ensure that the pod to external service bindings are not lost.

Figure 4B:
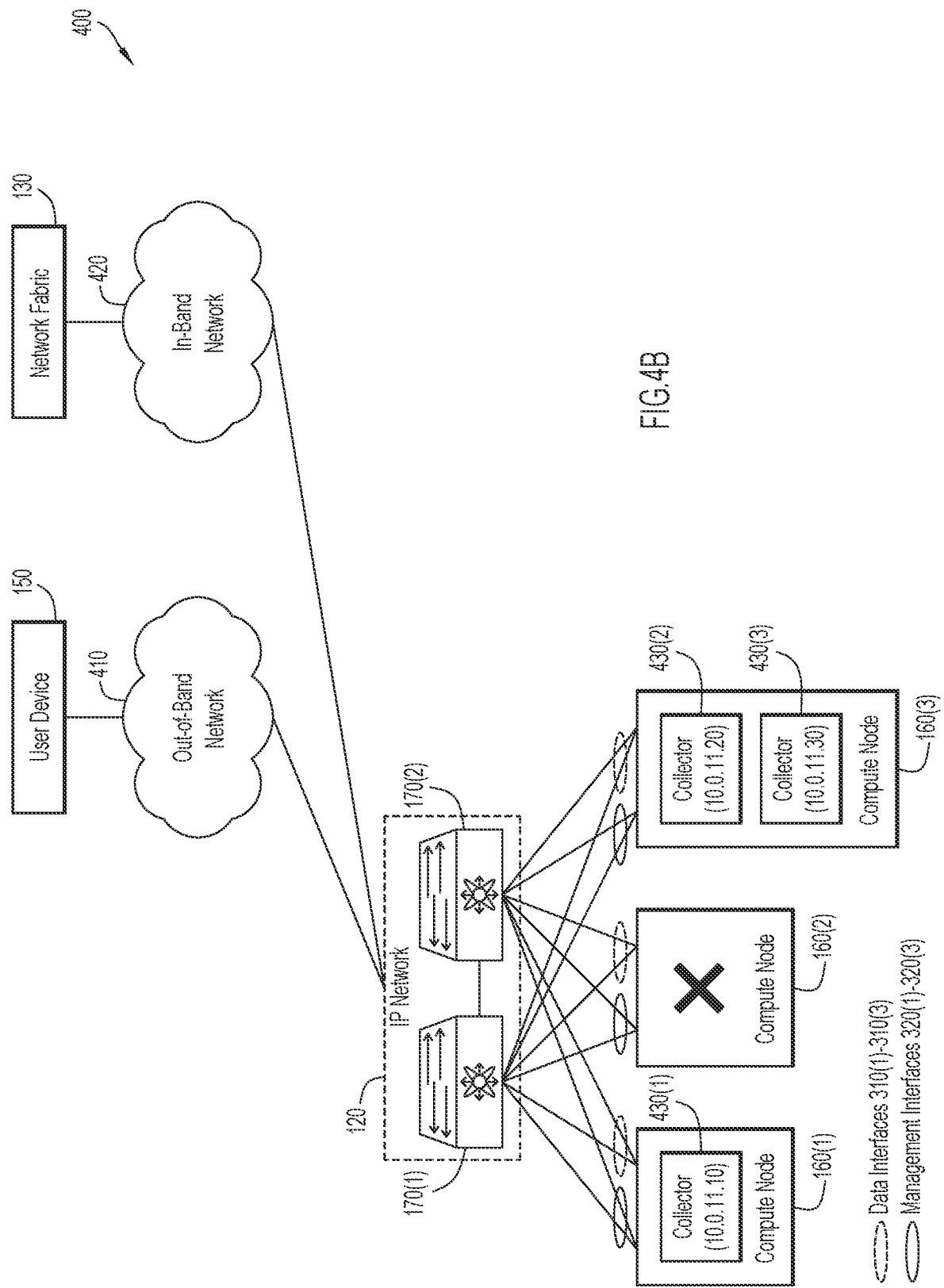

FIG. 4B illustrates Layer-2 adjacent system 400 after a failover has occurred. More specifically, compute node 160(2) has failed, and in response cluster 110 has respawned (has been rescheduled on) collector 430(2) at compute node 160(3) with the same IP address (i.e., 10.0.11.20). When the pod associated with collector 430(2) is destroyed (e.g., because compute node 160(2) has failed), collector 430(2) may also be destroyed. However, because the pod is bound to the service performed by collector 430(2), the associated IP address (i.e., 10.0.11.20) may persist on compute node 160(3), as the logic of the CNI/IPAM binding may operate during container creation.

The finalizer added on collectors 430(1)-430(3) may ensure that when the pod moves from compute node 160(2) to compute node 160(3), the same binding may be brought up on compute node 160(3) to ensure stickiness. Thus, the configured IP addresses may remain sticky to collectors 430(1)-430(3) for the life-cycle of collectors 430(1)-430(3). Because collector 430(2) has been assigned the same IP address, network fabric 130 may not need to be reconfigured with a different external IP address to access collector 430(2). As a result, collector 430(2) may seamlessly (or near-seamlessly) continue providing the service of telemetry data collection for network fabric 130.

Figure 5:
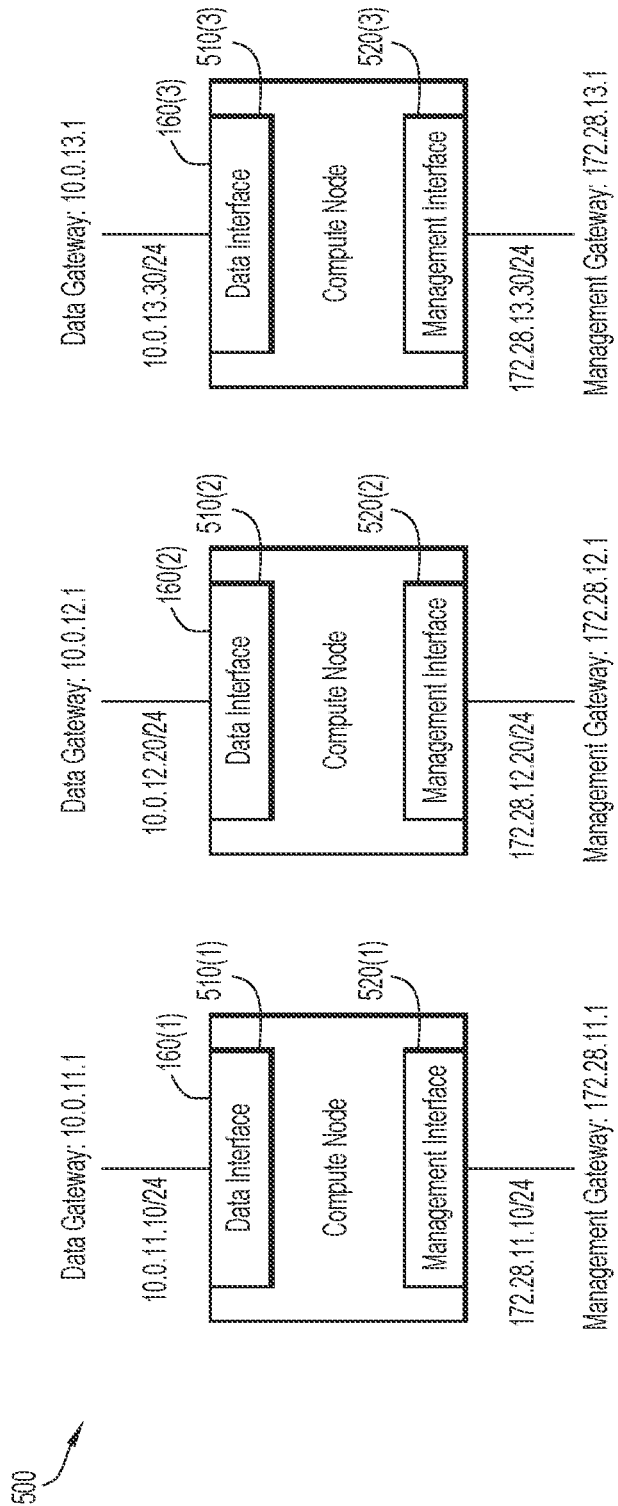
FIGS. 5, 6A, and 6B illustrates a Layer-3 adjacent use case in which compute nodes in a cluster belong to different subnetworks, according to an example embodiment.

With continuing reference to FIG. 1, FIGS. 5, 6A, and 6B illustrate a Layer-3 adjacent use case in which compute nodes 160(1)-160(3) belong to different subnetworks, according to an example embodiment. FIG. 5 illustrates a system 500 that includes compute nodes 160(1)-160(3), which in this example are Layer-3 adjacent. Compute nodes 160(1)-160(3) include data interfaces 510(1)-510(3) and management interfaces 520(1)-520(3). The techniques discussed in relation to FIGS. 5, 6A, and 6B may be similar in at least some respects to the techniques discussed above in relation to FIGS. 3, 4A, and 4B.

Data interfaces 510(1)-510(3) may also be referred to as in-band interfaces, and management interfaces 520(1)-520(3) may also be referred to as OOB interfaces. Data interfaces 510(1)-510(3) may be used to collect data (e.g., telemetry data) from network devices 180(1)-180(L). Management interfaces 520(1)-520(3) may be used for other communications, such as commands from a GUI on user device 150.

In this example, data interfaces 510(1)-510(3) have IP addresses 10.0.11.10/24, 10.0.12.20/24, and 10.0.13.30/24, respectively, and have different data gateways (10.0.11.1, 10.0.12.1, 10.0.13.1). As a result, the IP addresses of data interfaces 510(1)-510(3) belong to different subnetworks. Similarly, management interfaces 520(1)-520(3) have IP addresses 172.28.11.10/24, 172.28.12.20/24, and 172.28.13.30/24, respectively, and have different management gateways (172.28.11.1, 172.28.12.1, 172.28.13.1). As a result, the IP addresses of management interfaces 520(1)-520(3) also belong to different subnetworks. In this example, the subnetworks of IP addresses of data interfaces 510(1)-510(3) are different from the subnetworks of the IP addresses of management interfaces 520(1)-520(3).

Figure 6A:
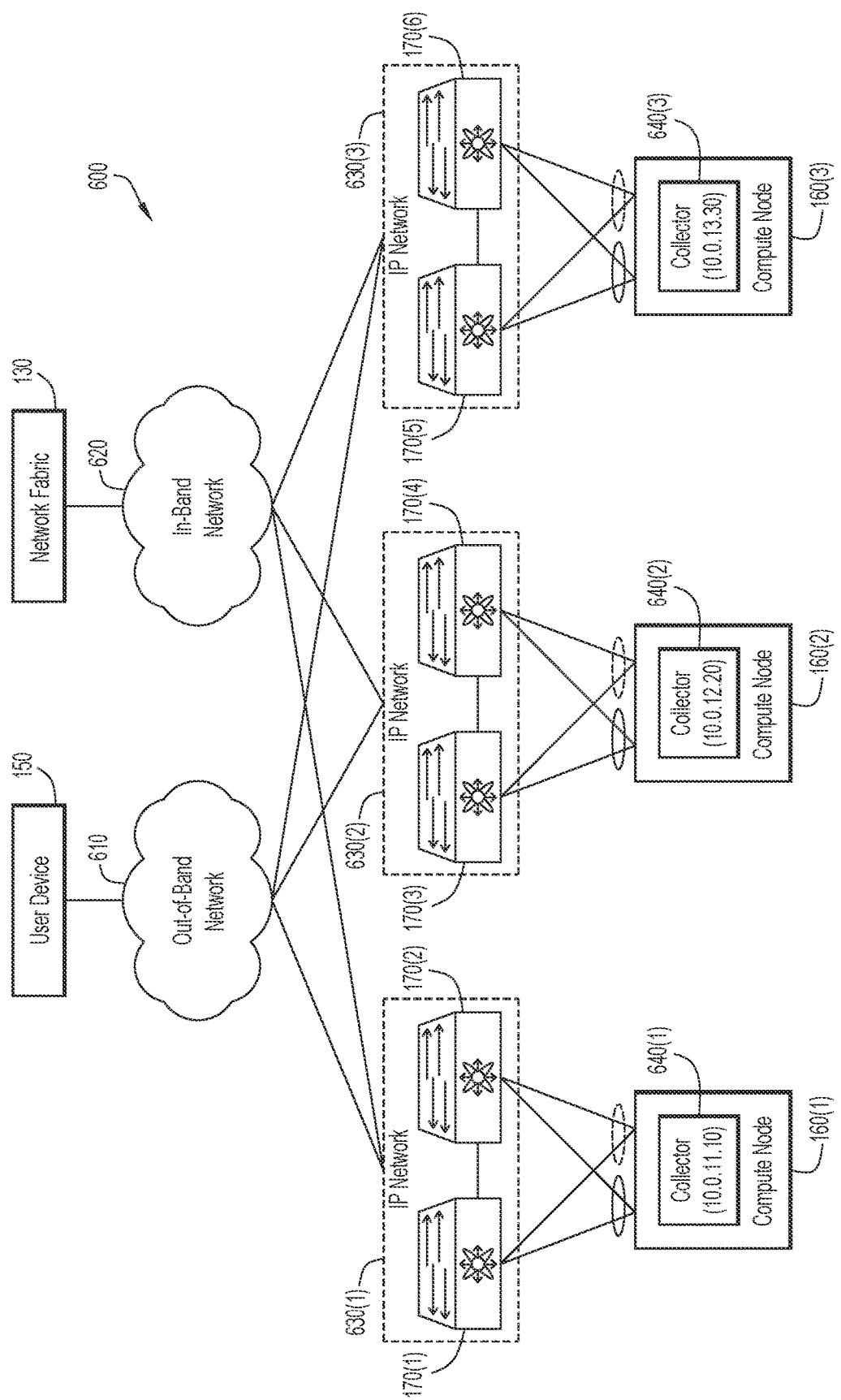

FIG. 6A illustrates a Layer-3 adjacent system 600. Layer-3 adjacent system 600 includes user device 150, OOB network 610, network fabric 130, in-band network 620, IP networks 630(1)-630(3), and compute nodes 160(1)-160(3). OOB network 410 (e.g., Internet 140) may enable external web access to cluster 110. In-band network 420 may provide IP reachability to network fabric 130 via front-panel ports of compute nodes 160(1)-160(3). IP networks 630(1)-630(3) may be part of IP network 120. IP network 630(1) includes network devices 170(1) and 170(2); IP network 630(2) includes network devices 170(3) and 170(4); and IP network 630(3) includes network devices 170(5) and 170(6).

Compute nodes 160(1)-160(3) include collectors 640(1)-640(3). Collectors 640(1)-640(3) may be services for collecting telemetry data from network fabric 130 via data interfaces 510(1)-510(3). Collectors 640(1)-640(3) have IP addresses 10.0.11.10, 10.0.12.20, and 10.0.13.30, respectively. Thus, the IP addresses of collectors 630(1)-630(3) belong to different subnetworks with the data interfaces.

As shown, compute node 160(1) communicates with network devices 170(1) and 170(2) via data interface 510(1) and management interface 520(1). Compute node 160(1) communicates with network devices 170(1) and 170(2) via data interface 510(1) over a VLAN designated for data communications (e.g., 10.0.11.1/24), and via management interface 520(1) over a VLAN designated for management communications (e.g., 172.28.11.1/24).

Compute node 160(2) communicates with network devices 170(3) and 170(4) via data interface 510(2) and management interface 520(2). Compute node 160(2) communicates with network devices 170(3) and 170(4) via data interface 510(2) over a VLAN designated for data communications (e.g., 10.0.12.1/24), and via management interface 520(2) over a VLAN designated for management communications (e.g., 172.28.12.1/24).

Compute node 160(3) communicates with network devices 170(5) and 170(6) via data interface 510(3) and management interface 520(3). Compute node 160(3) communicates with network devices 170(5) and 170(6) via data interface 510(3) over a VLAN designated for data communications (e.g., 10.0.13.1/24), and via management interface 520(3) over a VLAN designated for management communications (e.g., 172.28.13.1/24).

Figure 6B:
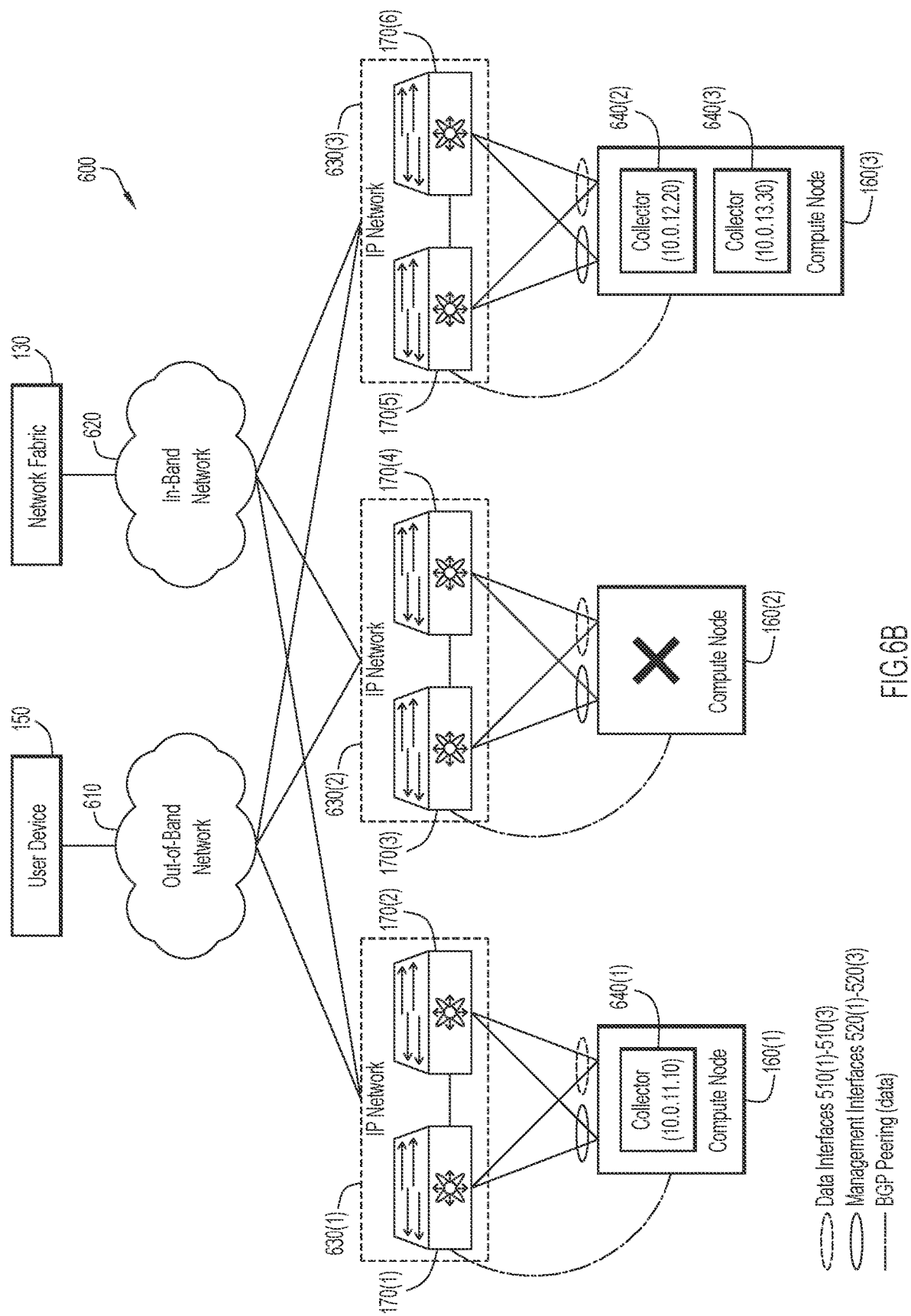

FIG. 6B illustrates Layer-3 adjacent system 600 after a failover has occurred. More specifically, compute node 160(2) has failed, and in response cluster 110 has respawned collector 640(2) at compute node 160(3) with the same IP address (i.e., 10.0.13.30). Because collector 640(2) has been assigned the same IP address, network fabric 130 may not need to be reconfigured with a different external IP address to access collector 640(2). As a result, collector 640(2) may seamlessly (or near-seamlessly) continue providing the service of telemetry data collection for network fabric 130.

In this example, cluster 110 may provide a reachability advertisement indicating that the IP address has been assigned to collector 640(2). The reachability advertisement may be made using a BGP peering mechanism, though the reachability advertisement may be made dynamically using BGP or any other suitable mechanism for advertising/32 or/128 addresses, for example.

As shown, compute node 160(1) provides the reachability advertisement to IP network 630(1), compute node 160(2) provides the reachability advertisement to IP network 630(2), and compute node 160(3) provides the reachability advertisement to IP network 630(3). In one example, compute nodes 160(1)-160(3) may include BGP daemons that detect all bridges that are provisioned with the external IP addresses and advertise those addresses over the configured BGP peering to IP network 120. This may ensure that Layer-3 reachability to the external IP addresses is effectively distributed for seamless reachability. The host or/32 advertisement from compute node 160(3) may avoid tromboning of traffic.

Figure 7:
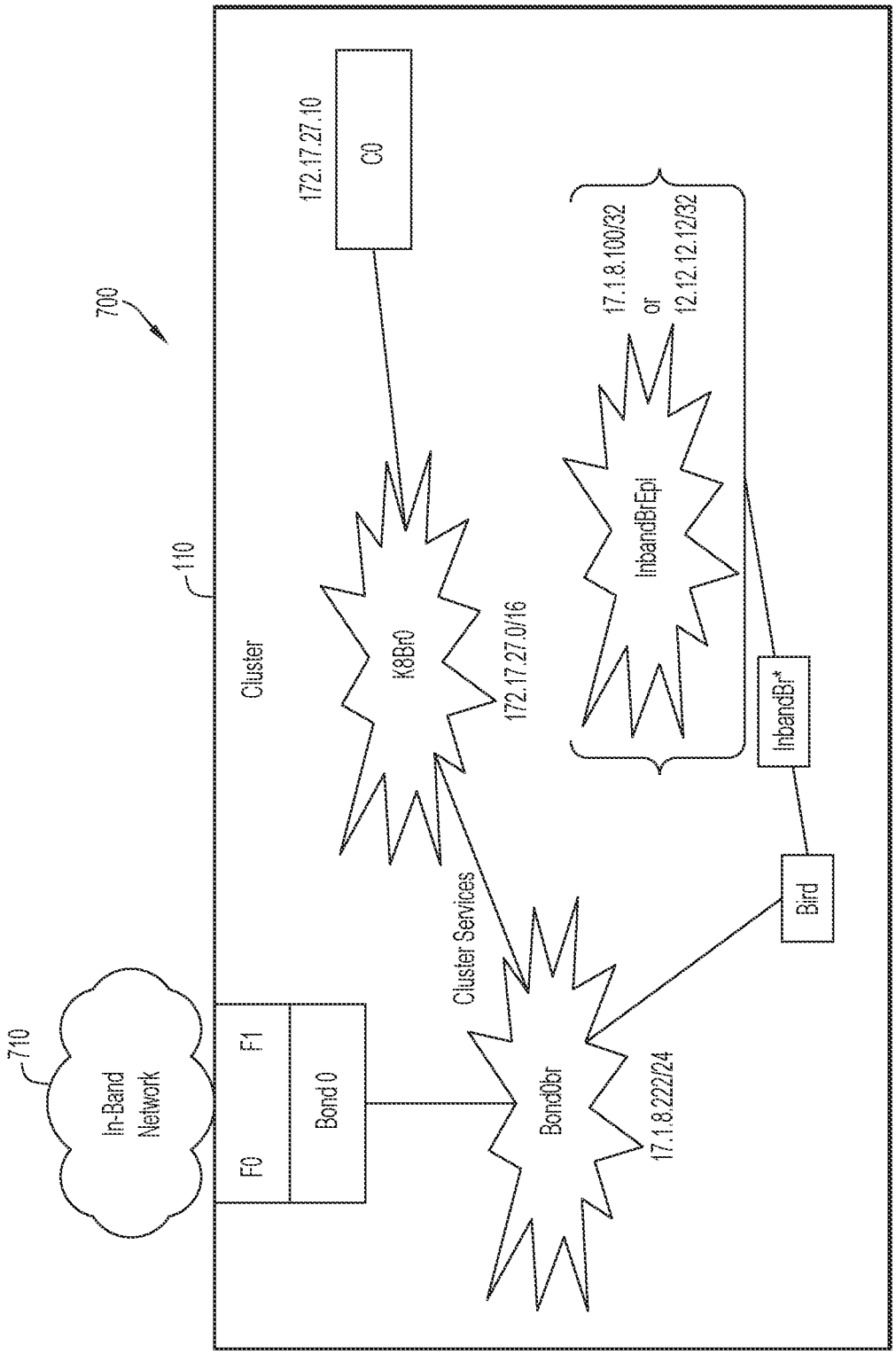
FIG. 7 illustrates a partial view of a cluster configured to provide a persistent external IP address for extra-cluster in-band services, according to an example embodiment.

With continuing reference to FIG. 1, FIG. 7 illustrates a partial view 700 of cluster 110, according to an example embodiment. In this example, cluster 110 is configured to provide a persistent external IP address for extra-cluster in-band services. Cluster 110 includes physical interfaces ("F0" and "F1"), a logical interface ("Bond 0"), a Bond 0 bridge ("BondObr"), a K8s bridge ("K8Br0"), a container configured to provide EPL services ("C0"), a client-side implementation of BGP to advertise the routes over Layer-3 ("Bird"), a software bridge ("InbandBr*"), and an in-band bridge for C0 ("InbandBrEp1"). Bond 0 may bundle F0 and F1 on a physical or virtual server. F0 and F1 may enable reachability to in-band network 710. InbandBr* may allow containers connected to the same bridge network to communicate while providing isolation from containers which are not connected to that bridge network. External communication across nodes may be performed over a VXLAN overlay.

Bond 0 may be part of the 17.1.8.0/24 subnetwork. BondObr has the IP address 17.1.8.222/24 and K8Br0 has the IP address 172.17.27.0/16. C0 has an internal IP address (172.17.27.10), which allows C0 to communicate with other containers in cluster 110. InbandBrEp1 is associated with C0 (and the pod that includes C0). In one example, cluster 110 has assigned to InbandBrEp1 the external IP address 17.1.8.100/32 from a pool of available IP addresses. In this example, network entities outside cluster 110 view C0 as 17.1.8.100/32, and traffic that is sent from C0 outside cluster 110 may be sent with 17.1.8.100/32. Because the external IP address should be reachable from outside cluster 110, 17.1.8.100/32 may be a node-level external IP address, rather than an in-band IP address that cannot be allocated for external use. If C0 goes down, cluster 110 may bring up C0 at another location and assign the same external IP address (i.e., 17.1.8.100/32) to C0. This ensures that an external network entity sees no disruption to the service provided by C0.

While in this example InbandBrEp1 was assigned an IP address that is in the same subnetwork as Bond 0, in another example cluster 110 may assign to InbandBrEp1 the external IP address 12.12.12.12/32, which is in a different subnetwork than the IP address of Bond 0. In that case, network entities outside cluster 110 view C0 as 12.12.12.12/32, and traffic that is sent from C0 outside cluster 110 may be sent with 12.12.12.12/32. Because the external IP address should be reachable from outside cluster 110, 12.12.12.12/32 may be a node-level external IP address, rather than an in-band IP address that cannot be allocated for external use. If C0 goes down, cluster 110 may bring up C0 at another location and assign the same external IP address (i.e., 12.12.12.12/32) to C0. Cluster 110 may advertise 12.12.12.12/32 to IP network 120 using, e.g., BGP, to ensure that IP network 120 knows that C0 may be reached using 12.12.12.12/32. This ensures that an external network entity sees no disruption to the service provided by C0.

Figure 8:
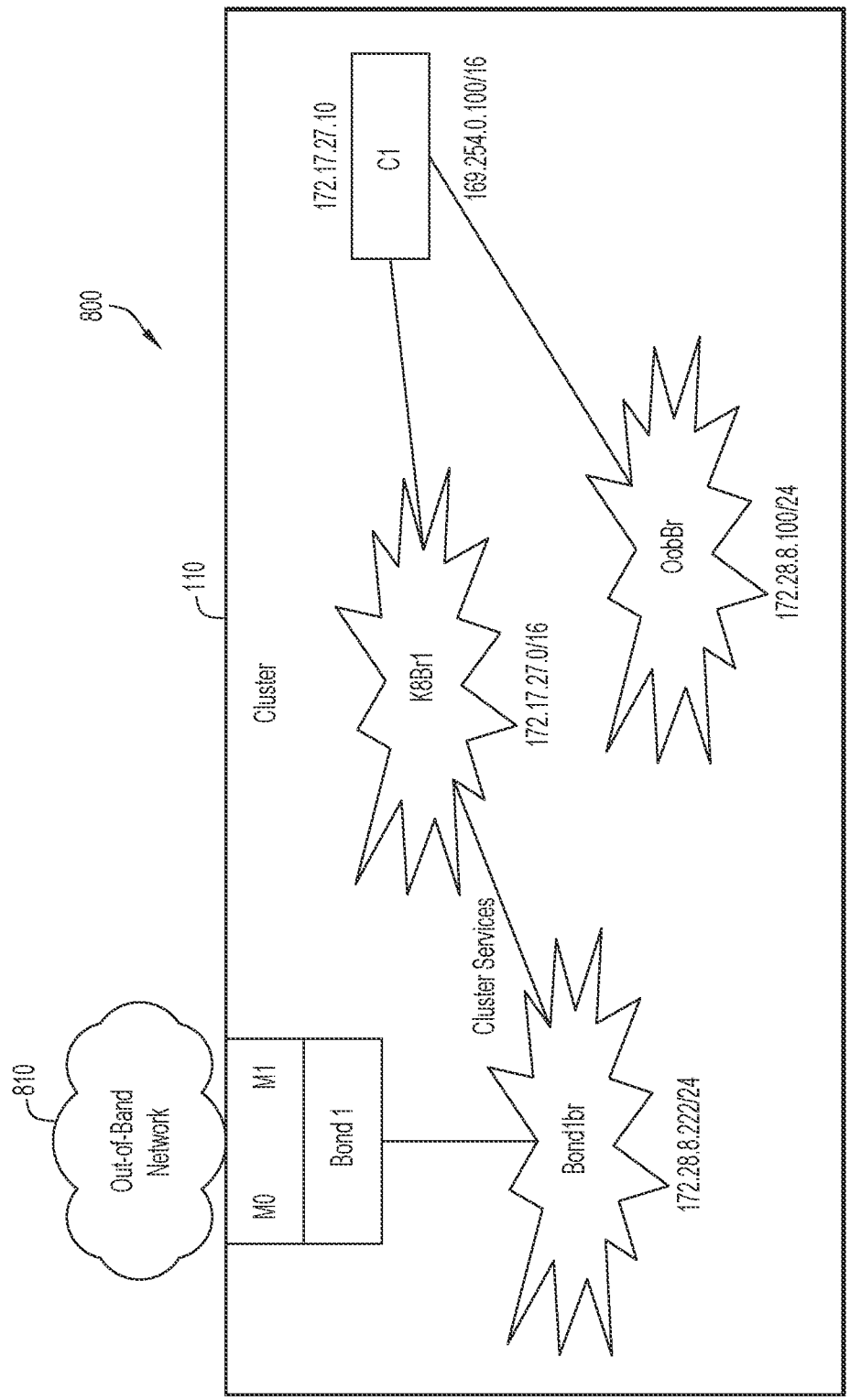
FIG. 8 illustrates a partial view of a cluster configured to provide a persistent external IP address for extra-cluster Out-of-Band (OOB) services, according to an example embodiment.

With continuing reference to FIG. 1, FIG. 8 illustrates a partial view 800 of cluster 110, according to an example embodiment. In this example, cluster 110 is configured to provide a persistent external IP address for extra-cluster OOB (e.g., management) services. Cluster 110 includes physical interfaces ("M0" and "M1"), a logical interface ("Bond 1"), a Bond 1 Bridge ("Bond1br"), a K8s Bridge ("K8Br1"), a container C1, and an OOB Bridge ("OobBr"). Bond 1 may bundle M0 and M1 on a physical or virtual server. Out-of-Band network 810 may be reachable through M0 and M1.

Bond1 may be part of the 172.28.8.0/24 subnetwork. Bond1br has the IP address 172.28.8.222/24 and K8Br1 has the IP address 172.17.27.0/16. C1 has an internal IP address (172.17.27.10), which allows C1 to communicate with other containers in cluster 110. C1 also has another internal IP address (169.254.0.100/16), which is logically stitched to OobBr.

OobBr is associated with C1 (and the pod that includes C1). Cluster 110 has assigned to OobBr the external IP address 172.28.8.100/24 from a pool of available IP addresses. As a result, network entities outside cluster 110 view C1 as 172.28.8.100/24, and traffic that is sent from C1 outside cluster 110 may be sent with 172.28.8.100/24. Because the external IP address should be reachable from outside cluster 110, 172.28.8.100/24 may be a node-level external IP address, rather than an OOB IP address that cannot be allocated for external use.

If C1 goes down, cluster 110 may bring up C1 at another location and assign the same external IP address (i.e., 172.28.8.100/24) to C1. This ensures that an external network entity sees no disruption to the service provided by C1. While in this example OobBr was assigned an IP address that is in the same subnetwork as Bond1, it will be appreciated that in other examples OobBr may be assigned an IP address that is in a different subnetwork that Bond1.

Figure 9:
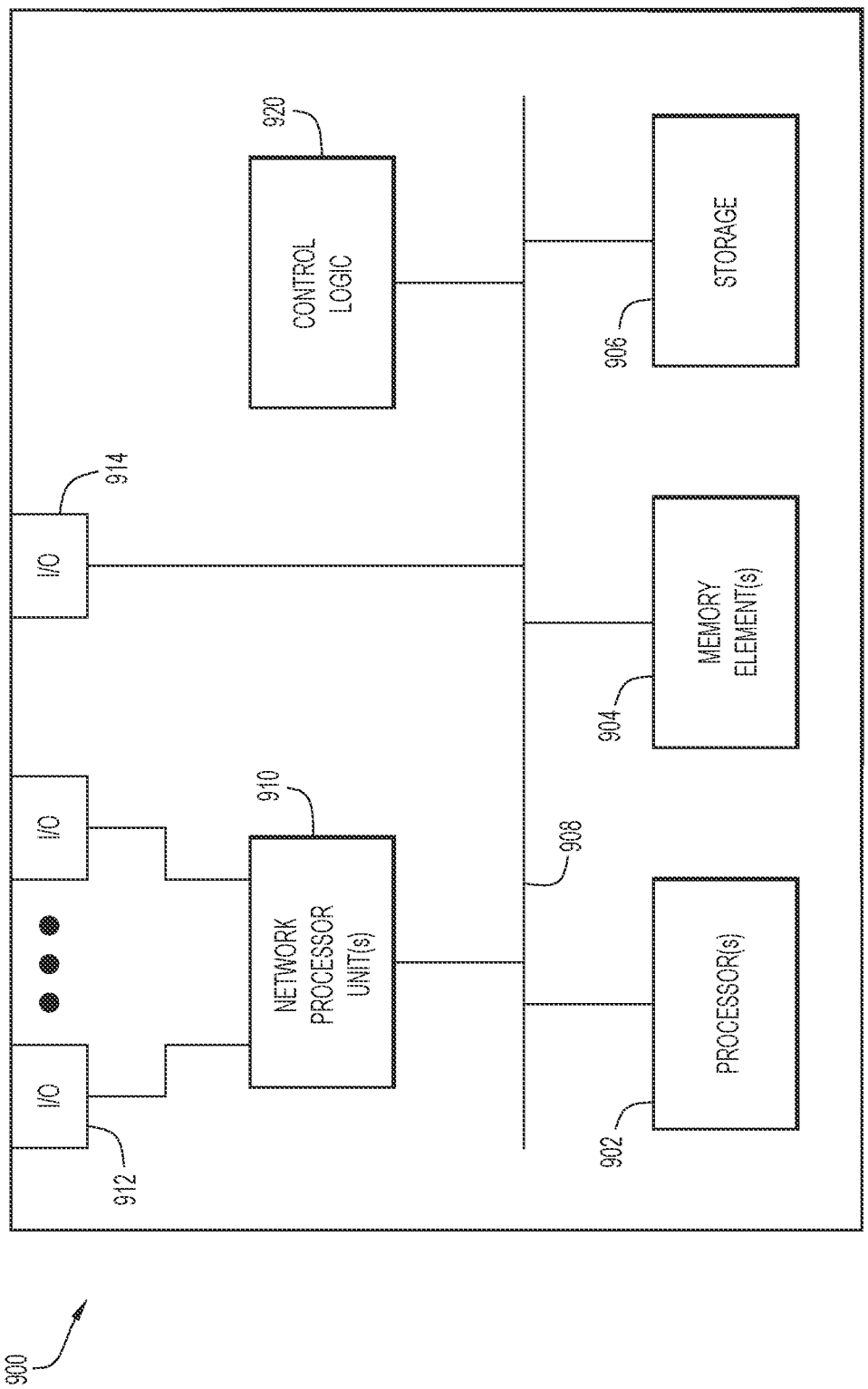
FIG. 9 illustrates a hardware block diagram of a computing device configured to perform functions associated with operations discussed herein, according to an example embodiment.

Referring to FIG. 9, FIG. 9 illustrates a hardware block diagram of a computing device 900 that may perform functions associated with operations discussed herein in connection with the techniques depicted in FIGS. 1-3, 4A, 4B, 5, 6A, 6B, 7, and 8. In various embodiments, a computing device, such as computing device 900 or any combination of computing devices 900, may be configured as any entity/entities as discussed for the techniques depicted in connection with FIGS. 1-3, 4A, 4B, 5, 6A, 6B, 7, and 8 in order to perform operations of the various techniques discussed herein.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interfaces 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory elements 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 900 for transfer onto another computer readable storage medium.

Figure 10:
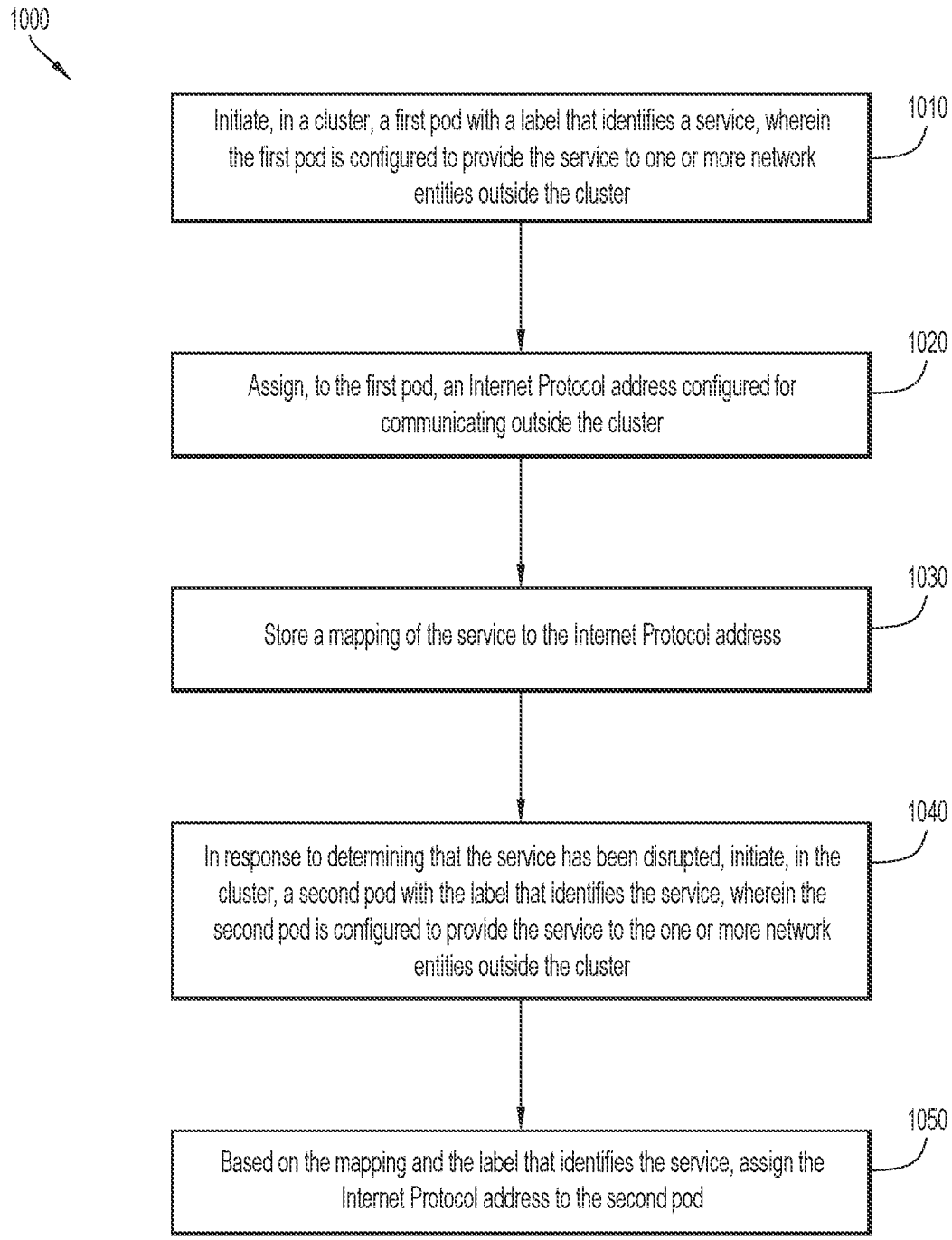
FIG. 10 illustrates a flowchart of a method for performing functions associated with operations discussed herein, according to an example embodiment.

FIG. 10 is a flowchart of a method 1000 for performing functions associated with operations discussed herein, according to an example embodiment. Method 1000 may be performed by any suitable entity, such as computing device 900 and/or cluster 110. Operation 1010 involves initiating, in a cluster, a first pod with a label that identifies a service, wherein the first pod is configured to provide the service to one or more network entities outside the cluster. Operation 1020 involves assigning, to the first pod, an IP address configured for communicating outside the cluster.

Operation 1030 involves storing a mapping of the service to the IP address. Operation 1040 involves, in response to determining that the service has been disrupted, initiating, in the cluster, a second pod with the label that identifies the service, wherein the second pod is configured to provide the service to the one or more network entities outside the cluster. Operation 1050 involves, based on the mapping and the label that identifies the service, assigning the IP address to the second pod.

In certain embodiments, a backend may automatically provision an external network interface into a pod that will obtain the external IP address directly in the pod. A backend API may support creation, modification and deletion of external services. A JavaScript Object Notation (JSON) object for the external service may include attributes such as name (e.g., the string which is the primary key), target (e.g., enum(Data, management) which represents which network to use), and pool (e.g., the list of IP addresses to be selected from for the external service). One example is provided as follows: json model {"name": "eplservice-1", "target": "Data", "pool": ["1.1.1.1", "2.2.2.2"] } API Endpoints: POST: api/config/externalservices DELETE: api/config/externalservices/.

A pod may obtain multiple network interfaces on multiple node-level networks, which may also be referred to as physical network/physnet. Each physical network may include an external node-level IP address and internal IP address pools used to allocate IP addresses to network interfaces for pods requesting an IP address on a specific physnet. In one example, a container may be placed directly on a K8s bridge serving a specific node-level network.

Microservices configured to use a persistent IP address may be provided with a bridge dedicated to that microservice. The persistent IP address may be assigned to a container interface directly or via the software bridge. The bridge may carry a private network to within the container as well as an external IP address that may be used for both Source NAT (SNAT) and Destination NAT (DNAT) services. Packets leaving the microservice for external communication, for example, to a switch may be SNATed to the external IP address. Packets that are received from external entities, again for example a switch, to a dashboard cluster may be DNATed to the private IP address while preserving the source IP address. If a logical service requires multiple microservices to operate, multiple microservice containers may be added to the same pod.

Node-level fault detection, which may occur roughly once every six minutes, may determine pod rescheduling. Faster or slower paces for applications may be set by configuring taints in the pod specifications. If an application uses stateful sets instead of deployment, stateful set K8s criteria may be followed for placement and rescheduling.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: initiating, in a cluster, a first pod with a label that identifies a service, wherein the first pod is configured to provide the service to one or more network entities outside the cluster; assigning, to the first pod, an Internet Protocol address configured for communicating outside the cluster; storing a mapping of the service to the Internet Protocol address; in response to determining that the service has been disrupted, initiating, in the cluster, a second pod with the label that identifies the service, wherein the second pod is configured to provide the service to the one or more network entities outside the cluster; and based on the mapping and the label that identifies the service, assigning the Internet Protocol address to the second pod.

In one example, assigning the Internet Protocol address to the first pod includes assigning the Internet Protocol address to a first bridge associated with the first pod; and assigning the Internet Protocol address to the second pod includes assigning the Internet Protocol address to a second bridge associated with the second pod.

In one example, assigning the Internet Protocol address to the first pod includes assigning the Internet Protocol address to a first container interface associated with the first pod; and assigning the Internet Protocol address to the second pod includes assigning the Internet Protocol address to a second container interface associated with the second pod.

In one example, assigning the Internet Protocol address to the second pod includes: assigning, to the second pod, an Internet Protocol address that shares a subnetwork with an Internet Protocol address of an interface associated with the second pod.

In one example, assigning the Internet Protocol address to the second pod includes: assigning, to the second pod, an Internet Protocol address that is on a different subnetwork than an interface associated with the second pod. In a further example, the method further comprises: providing a reachability advertisement indicating that the Internet Protocol address has been assigned to the second pod.

In one example, the service includes a service for collecting telemetry data from a network fabric that includes the one or more network entities.

In one example, the service includes a service for enabling management of the cluster by the one or more network entities.

In one example, the method further comprises: providing, by the second pod, the service to the one or more network entities outside the cluster using the Internet Protocol address. In a further example, providing the service by the second pod includes: mitigating a negative impact on the service provided to the one or more network entities outside the cluster. In another further example, providing the service by the second pod includes: preserving a configuration or provisioning of the one or more network entities outside the cluster.

In another form, a system is provided. The system comprises: a plurality of compute nodes configured to: initiate, in a cluster, a first pod with a label that identifies a service, wherein the first pod is configured to provide the service to one or more network entities outside the cluster; assign, to the first pod, an Internet Protocol address configured for communicating outside the cluster; store a mapping of the service to the Internet Protocol address; in response to determining that the service has been disrupted, initiate, in the cluster, a second pod with the label that identifies the service, wherein the second pod is configured to provide the service to the one or more network entities outside the cluster; and based on the mapping and the label that identifies the service, assign the Internet Protocol address to the second pod.

In another form, one or more non-transitory computer readable storage media are provided. The non-transitory computer readable storage media are encoded with instructions that, when executed by a processor, cause the processor to: initiate, in a cluster, a first pod with a label that identifies a service, wherein the first pod is configured to provide the service to one or more network entities outside the cluster; assign, to the first pod, an Internet Protocol address configured for communicating outside the cluster; store a mapping of the service to the Internet Protocol address; in response to determining that the service has been disrupted, initiate, in the cluster, a second pod with the label that identifies the service, wherein the second pod is configured to provide the service to the one or more network entities outside the cluster; and based on the mapping and the label that identifies the service, assign the Internet Protocol address to the second pod.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A method comprising:
   initiating, in a cluster, a first pod with a label that identifies a first service among a plurality of services, wherein the first pod is configured to provide the first service to one or more network entities outside the cluster;
   determining that the first service is associated with a first Internet Protocol address based on a stored mapping that directly maps each service in the plurality of services to a corresponding Internet Protocol address;
   assigning, to the first pod, the first Internet Protocol address configured for communicating outside the cluster;
   in response to determining that the first service has been disrupted at the first pod, initiating, in the cluster, a second pod with the label that identifies the first ser- vice, wherein the second pod is configured to provide the first service to the one or more network entities outside the cluster;

based on the stored mapping and the label that identifies the first service, assigning the first Internet Protocol address to the second pod, wherein the first Internet Protocol address of the first pod is configured for the second pod; and providing a reachability advertisement indicating that the first Internet Protocol address has been assigned to the second pod.

2. The method of claim 1, wherein:
the assigning the first Internet Protocol address to the first pod includes assigning the first Internet Protocol address to a first bridge associated with the first pod; and
the assigning the first Internet Protocol address to the second pod includes assigning the first Internet Protocol address to a second bridge associated with the second pod.

3. The method of claim 1, wherein:
the assigning the first Internet Protocol address to the first pod includes assigning the first Internet Protocol address to a first container interface associated with the first pod; and
the assigning the first Internet Protocol address to the second pod includes assigning the first Internet Protocol address to a second container interface associated with the second pod.

4. The method of claim 1, wherein the assigning the first Internet Protocol address to the second pod includes:
assigning, to the second pod, an Internet Protocol address that shares a subnetwork with an Internet Protocol address of an interface associated with the second pod.

5. The method of claim 1, wherein the first pod is hosted on a compute node of the cluster.

6. The method of claim 1, wherein the first service includes a service for collecting telemetry data from a network fabric that includes the one or more network entities.

7. The method of claim 1, wherein the first service includes a service for enabling management of the cluster by the one or more network entities.

8. The method of claim 1, further comprising:
providing, by the second pod, the first service to the one or more network entities outside the cluster using the first Internet Protocol address.

9. The method of claim 8, wherein the providing the first service by the second pod includes:
mitigating a negative impact on the first service provided to the one or more network entities outside the cluster.

10. The method of claim 9, wherein the providing the first service by the second pod includes:
preserving a configuration or provisioning of the one or more network entities outside the cluster.

11. A system comprising:
a plurality of compute nodes comprising one or more hardware processors configured to:
initiate, in a cluster, a first pod with a label that identifies a first service among a plurality of services, wherein the first pod is configured to provide the first service to one or more network entities outside the cluster;
determine that the first service is associated with a first Internet Protocol address based on a stored mapping between each service in the plurality of services and a corresponding Internet Protocol address;
assign, to the first pod, the first Internet Protocol address configured for communicating outside the cluster;
in response to determining that the first service has been disrupted at the first pod, initiate, in the cluster, a second pod with the label that identifies the first service, wherein the second pod is configured to provide the first service to the one or more network entities outside the cluster;
based on the stored mapping and the label that identifies the first service, assign the first Internet Protocol address to the second pod, wherein the first Internet Protocol address of the first pod is configured for the second pod; and
provide a reachability advertisement indicating that the first Internet Protocol address has been assigned to the second pod.

12. The system of claim 11, wherein the plurality of compute nodes is configured to:
assign the first Internet Protocol address to a first bridge associated with the first pod; and
assign the first Internet Protocol address to a second bridge associated with the second pod.

13. The system of claim 11, wherein the plurality of compute nodes is configured to:
assign the first Internet Protocol address to the first pod by assigning the first Internet Protocol address to a first container interface associated with the first pod; and
assign the first Internet Protocol address to the second pod by assigning the first Internet Protocol address to a second container interface associated with the second pod.

14. The system of claim 11, wherein the plurality of compute nodes is configured to:
assign, to the second pod, an Internet Protocol address that shares a subnetwork with an Internet Protocol address of an interface associated with the second pod.

15. The system of claim 11, wherein the plurality of compute nodes host the first pod.

16. The system of claim 11, wherein the first service includes a service for collecting telemetry data from a network fabric that includes the one or more network entities.

17. One or more non-transitory computer readable storage medium encoded with instructions that, when executed by a processor, cause the processor to:
initiate, in a cluster, a first pod with a label that identifies a first service among a plurality of services, wherein the first pod is configured to provide the first service to one or more network entities outside the cluster;
determine that the first service is associated with a first Internet Protocol address based on a stored mapping between each service in the plurality of services and a corresponding Internet Protocol address;
assign, to the first pod, the first Internet Protocol address configured for communicating outside the cluster;
in response to determining that the first service has been disrupted at the first pod, initiate, in the cluster, a second pod with the label that identifies the first service, wherein the second pod is configured to provide the first service to the one or more network entities outside the cluster;
based on the stored mapping and the label that identifies the first service, assign the first Internet Protocol address to the second pod, wherein the first Internet Protocol address of the first pod is configured for the second pod; and provide a reachability advertisement indicating that the first Internet Protocol address has been assigned to the second pod.

18. The one or more non-transitory computer readable storage medium of claim 17, wherein the instructions cause the processor to:
  assign the first Internet Protocol address to a first bridge associated with the first pod; and
  assign the first Internet Protocol address to a second bridge associated with the second pod.

19. The one or more non-transitory computer readable storage medium of claim 17, wherein the instructions cause the processor to:
  assign, to the second pod, an Internet Protocol address that shares a subnetwork with an Internet Protocol address of an interface associated with the second pod.

20. The one or more non-transitory computer readable storage medium of claim 17, wherein the instructions cause the processor to:
  assign the first Internet Protocol address to the first pod by assigning the first Internet Protocol address to a first container interface associated with the first pod; and
  assign the first Internet Protocol address to the second pod by assigning the first Internet Protocol address to a second container interface associated with the second pod.

* * * * *